(12) United States Patent
Aiba et al.

(10) Patent No.: US 7,074,877 B2
(45) Date of Patent: *Jul. 11, 2006

(54) RESIN FOR USE IN MANUFACTURING WET FRICTION MATERIALS, MANUFACTURING METHOD THEREOF AND WET FRICTION MATERIAL

(75) Inventors: Hiroshi Aiba, Shizuoka (JP); Masahiro Mori, Shizuoka (JP)

(73) Assignees: Sumitomo Bakelite Company Limited (JP); NSK-Warner K.K. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/318,576

(22) Filed: Dec. 12, 2002

(65) Prior Publication Data

US 2003/0166825 A1 Sep. 4, 2003

(30) Foreign Application Priority Data

Dec. 14, 2001 (JP) ............................. 2001-381205

(51) Int. Cl.
*C08G 8/04* (2006.01)
*C08G 14/02* (2006.01)

(52) U.S. Cl. ..................... 528/129; 528/443; 528/486; 528/488; 528/489

(58) Field of Classification Search ................ 528/129, 528/443, 488, 489, 486
See application file for complete search history.

(56) References Cited

U.S. PATENT DOCUMENTS

| 5,250,588 | A | 10/1993 | Delvaux et al. |
| 5,453,317 | A | 9/1995 | Yesnik |
| 5,529,666 | A | 6/1996 | Yesnik |
| 5,563,196 | A | 10/1996 | Kitahara et al. |
| 6,231,977 | B1 * | 5/2001 | Suzuki et al. ............... 428/375 |

FOREIGN PATENT DOCUMENTS

| JP | 60-020935 | 2/1985 |
| JP | 01-288639 | 11/1989 |
| JP | 07-018094 | 1/1995 |
| JP | 09-059599 | 3/1997 |

* cited by examiner

*Primary Examiner*—Duc Truong
(74) *Attorney, Agent, or Firm*—Anderson Kill & Olick, PC

(57) ABSTRACT

A resin for use in manufacturing wet friction materials which contributes to enhancing durability of manufactured wet friction materials, a manufacturing method thereof, and a wet friction material having excellent durability are provided. The resin for use in manufacturing wet friction materials can be obtained by reacting phenols with aldehydes in the presence of at least one basic catalyst, which contains a water-soluble phenolic resin as a main component. Further, the manufacturing method of the resin for wet friction materials includes a step of reacting phenols with aldehydes in the presence of at least one basic catalyst to obtain a water-soluble phenolic resin having a predetermined water percentage. Furthermore, the wet friction material is manufactured by impregnating a base material with the resin for wet friction materials.

11 Claims, 1 Drawing Sheet

RESIN FOR USE IN MANUFACTURING WET FRICTION MATERIALS, MANUFACTURING METHOD THEREOF AND WET FRICTION MATERIAL

BACKGROUND OF THE INVENTION

1. Field of the Invention

This invention relates to a resin for use in manufacturing wet friction materials (hereinafter, referred to as a "resin for wet friction materials"), a manufacturing method thereof, and a wet friction material.

2. Description of the Prior Art

In automatic transmissions of vehicles and the like, wet friction materials are used, for example, in a wet frictional engagement device having a clutch which is operative in oil. A typical example of such a wet friction material is a paper-based wet friction material (which is also called as a paper friction material). Such a wet friction material is formed into a porous material so as to be able to contain a large amount of automatic transmission fluid (ATF). To enhance durability of such a wet friction material, it is required to have uniformly distributed micro pores due to the following reasons. Namely, in a wet frictional engagement device using such a wet friction material, at a time of sliding engagement the wet friction material is compressed by several µm to several tens µm to thereby discharge ATF retained therein through the pores, and is decompressed by absorbing ATF through the pores at a time of release. When ATF is discharged from the inside of the wet friction material, heat generated at its surface due to sliding is dissipated, thereby lowering a surface temperature which has been elevated during sliding. In this way, heat generated due to sliding is dissipated to prevent heat from accumulating in the wet friction material, thereby enabling to provide a cooling effect. This cooling effect significantly affects durability of the wet friction material. Therefore, in order to enhance durability of a wet friction material, it is necessary for the wet friction material to have uniformly distributed pores for enabling to discharge and absorb ATF appropriately.

A conventional wet friction material is composed of a paper body made of a fibrous base material and a resin for wet friction materials. The wet friction material is manufactured by impregnating the paper body with the resin dissolved in an organic solvent, and then drying and thermosetting the resin impregnated paper body. Here, the resin acts as a binder for fibers of the paper body.

However, the conventional wet friction material which is manufactured using the resin dissolved with the organic solvent necessarily accompanies migration of the binder (that is, the resin). As a result, there is a tendency that a concentration of the binder becomes high in a vicinity of the surface area of the paper body while becomes low in the central area of the paper body in a thickness direction thereof. Such non-uniform distribution of the binder results in relatively smaller number of pores in the surface area of the wet friction material. Such wet friction material having relatively smaller number of pores in the surface area thereof is quite disadvantageous for increasing the cooling efficiency (cooling effect) of the wet friction material, since the cooling efficiency can be enhanced by absorbing and discharging ATF through large number of pores as described above. In view of this problem, it is desired to provide a wet friction material having uniformly distributed pores by making the concentration of the binder uniform in a thickness direction of the material. Thus, a strong demand exists for a binder that can contribute to achieve the desire, that is a binder that can be impregnated into a paper body of a wet friction material with uniform concentration.

In addition, in recent years, great attention has been paid to energy conservation and reduction in environmental impacts throughout world. Under the circumstances, in the field of these wet friction materials, a demand for water-soluble phenolic resins for wet friction materials which do not use any organic solvent has been increased from the following reason.

Namely, a conventional wet friction material is manufactured using a resin dissolved with an organic solvent. In the manufacturing process, that resin is used by being diluted with the organic solvent to reach a target concentration. The used organic solvent is then volatilized in drying and thermosetting steps, and this volatilized organic solvent is collected to be disposed of by incineration. However, the incineration of the organic solvent not only consumes energy but also is harmful to environment. Therefore, in view of promotion of the energy conservation and reduction in environmental impacts, it is one of important issues in this technical field to develop a resin for wet friction materials that does not use such organic solvent, that is a water-soluble phenolic resin for wet friction materials.

As stated above, in this technical field, there is a strong demand for a resin that can simultaneously accomplish both the enhanced durability of wet friction materials and the use of a water-soluble resin for wet friction materials that does not use any organic solvent, but such a resin for wet friction materials has not yet been practically realized.

SUMMARY OF THE INVENTION

It is therefore an object of the present invention to provide a resin for wet friction materials which can manufacture wet friction materials having excellent durability and a manufacturing method thereof.

It is another object of the present invention to provide a wet friction material having excellent durability.

In order to achieve the objects mentioned above, one aspect of the present invention is directed to a resin for wet friction materials, the resin for wet friction materials being obtained by the reaction of phenols with aldehydes in the presence of at least one basic catalyst, wherein the resin comprises a water-soluble phenolic resin as a main component thereof.

In the present invention described above, it is preferred that the resin for wet friction materials is obtained by reacting the phenols and the aldehydes in a mole ratio (aldehydes/phenols) of 0.8 to 1.6.

Further, it is also preferred that the phenolic resin has a water percentage equal to or higher than 200%.

Furthermore, it is also preferred that the phenolic resin has a weight average molecular weight equal to or lower than 700.

Moreover, it is also preferred that the phenolic resin contains sulfite.

Another aspect of the present invention is directed to a method of manufacturing a resin for wet friction materials The method comprises the step of reacting phenols and aldehydes in the presence of at least one basic catalyst to obtain a water-soluble phenolic resin having a predetermined water percentage.

In this method, it is preferable to further comprise the step of adding sulfite to the obtained phenolic resin to be reacted to obtain a water-soluble phenolic resin having a predetermined water percentage.

Further, it is also preferred that the predetermined water percentage is equal to or higher than 200%.

Still another aspect of the present invention is directed to a wet friction material which comprises a base material and a binder impregnated to the base material, wherein the binder is formed of the resin for wet friction materials having any one of features described above.

These and other objects, structures and advantages of the present invention will be apparent from the following description of the invention and the examples.

DETAILED DESCRIPTION OF THE INVENTION

Figure 1:
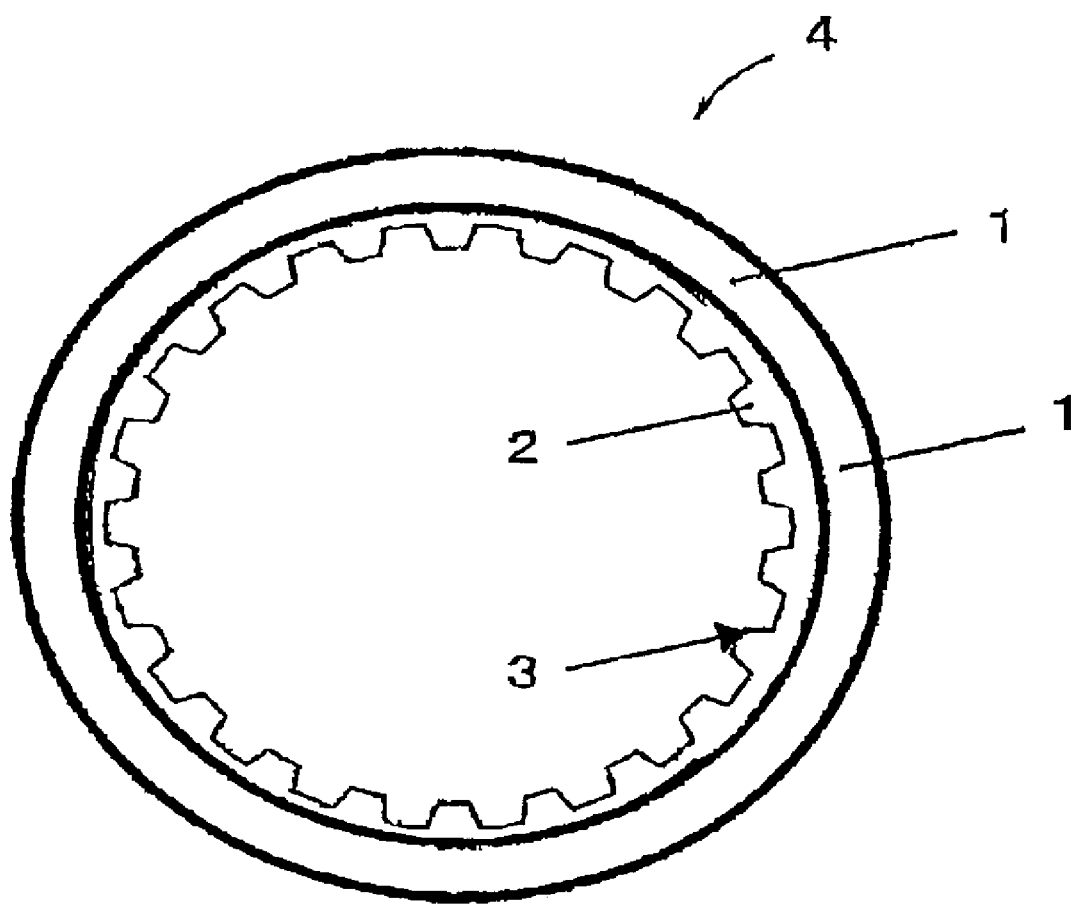
FIG. 1 is a front view which schematically shows a friction plate in which a wet friction material according to the present invention is used.

Hereinbelow, a detailed description will be made with regard to a resin for wet friction materials, a manufacturing method thereof, and a wet friction material according to the present invention.

The resin for wet friction materials of the present invention contains a water-soluble phenolic resin as a main component thereof, which is obtained by the reaction of phenols with aldehydes in the presence of at least one basic catalyst. The feature of the resin for wet friction materials of the present invention resides in that the water-soluble phenolic resin is used as a main component thereof.

As described above, conventionally a resin for wet friction materials is used by being dissolved in an organic solvent when manufacturing a wet friction material. During the manufacturing process, the organic solvent is volatilized, and according to the volatilization of the organic solvent the resin migrates toward a surface of a paper body made of a fibrous base material. This migration of the resin toward the surface of the paper body causes uneven or non-uniform distribution of concentration of the resin in the thickness direction of the wet friction material so that a surface area in a vicinity of the surface of the wet friction material has a relatively higher concentration while a central area of the material has a relatively lower concentration. Such non-uniform distribution of concentration of the resin results in a non-uniform distribution of pores in the wet friction material. Since the cooling effect caused by discharging and absorbing ATF significantly affects durability of the wet friction material, the existing wet friction material in which non-uniform distribution of the concentration of the resin due to the migration, that is non-uniform distribution of pores, is unavoidably caused can not achieve a sufficient cooling effect, thus the existing wet friction material does not have practically satisfactory durability.

In contrast, according to the present invention, since a water-soluble resin is used as the resin for wet friction materials, it is possible to improve impregnability of the resin into a paper body made of a fibrous base material, thereby enabling to obtain uniform distribution of the concentration of the resin in the thickness direction of the paper body. With this result, the durability of the wet friction material can be enhanced. Specifically, if the resin is uniformly distributed in a thickness direction of the wet friction material, it is possible to obtain a uniform distribution of pores in the wet friction material. The wet friction Material having such uniformly distributed pores makes it possible to enhance the cooling effect for lowering a surface temperature of the wet friction material elevated due to sliding which was a problem to be solved in the conventional wet friction material. This is supposed to result in the enhancement of the durability of the wet friction material.

Further, the manufacturing method according to the present invention is a method for manufacturing the resin for wet friction materials stated above. In this method, the water-soluble phenolic resin is obtained by reacting phenols with aldehydes in the presence of at least one basic catalyst until the weight average molecular weight of the resultant reaches a predetermined weight average molecular weight.

Furthermore, the feature of the wet friction material according to the present invention resides in that it is manufactured by impregnating a base material with the resin for wet friction materials described above.

Hereinbelow, a description will be made with regard to the resin for wet friction materials of the present invention.

The resin for wet friction materials of the present invention contains a water-soluble phenolic resin as its main component, which is obtained by the reaction of phenols with aldehydes in the presence of at least one basic catalyst. The thus obtained resin is a resol type phenolic resin. Examples of the phenols include phenol, cresol, xylenol, m-cresol, m-ethylphenol, resorcin, catechol, hydroquinone, bisphenol A, and the like. These phenols may be used either alone or in combination of two or more kinds. Among these phenols, phenol and resorcin are especially preferable. By using these phenols, it is possible to further increase water solubility of the resin for wet friction materials.

Examples of the aldehydes include paraformaldehyde, formaldehyde, trioxane, acetaldehyde, benzaldehyde, and the like. These aldehydes may be used either alone or in combination of two or more kinds. Among these aldehydes, paraformaldehyde and formaldehyde are especially preferable By using these aldehydes, it is possible to further increase water solubility of the resin for wet friction materials.

The mole ratio between the phenols and the aldehydes in the reaction is not limited to any specific value, but is preferably 0.8 to 1.6, and more preferably 0.9 to 1.5. If the mole ratio in the reaction is less than the above lower limit value, there is a case where unreacted phenolic monomers are increased. On the other hand, if the mole ratio in the reaction exceeds the above upper limit value, a cross-linking density of the phenolic resin is increased, so that there is a case that the phenolic resin becomes excessively hard when cured, thereby decreasing a coefficient of friction of the manufactured wet friction material.

Examples of the basic catalyst include: alkalines such as sodium hydroxide, potassium hydroxide, barium hydroxide, calcium hydroxide; and amines such as triethylamine, triethanol amine. These basic catalysts may be used either alone or in combination of two or more kinds.

An amount of addition of the basic catalyst is not limited to any specific value, but is preferably 1 to 10 parts by weight, and more preferably 2 to 8 parts by weight per 100 parts by weight of phenols. By setting the amount of addition of the basic catalyst within the above range, it is possible to obtain a phenolic resin having exceptional water solubility.

As described above, the resin for wet friction materials of the present invention contains a water-soluble phenolic resin as a main component thereof. Use of such a resin in manufacturing wet friction materials makes it possible to distribute a binder in a manufactured wet friction material uniformly, whereby a porous wet friction material in which micro pores are uniformly distributed can be obtained. Such a uniform distribution of the micro pores in the wet friction material results in an increase in durability of the wet friction material. Here, the term "water-soluble phenolic resin" mentioned above means a phenolic resin, having a high compatibility with water and an ability to be dissolved with large amounts of water.

A water percentage of the phenolic resin is not limited to any specific value, but is preferably equal to or higher than 200%, and more preferably 300 to 1.000%. If the water percentage is less than the above lower limit value, there is a case where impregnability of the phenolic resin into a fibrous base material of a wet friction material is impaired. On the other hand, if the water percentage exceeds the above upper limit value, there is a case where an effect for enhancing durability of the manufactured wet friction material is decreased.

Further, if the phenolic resin has 200% or more of water percentage, impregnability of the water-soluble resin into a fibrous base material of a wet friction material is increased, which makes it possible to obtain a wet friction material in which the resin is more uniformly distributed in a thickness direction thereof. As a result, it becomes possible to obtain a wet friction material having uniformly distributed pores, whereby the cooling effect for lowering a surface temperature of the wet friction material elevated due to sliding can be further enhanced. Consequently, durability of the wet friction material can also be further enhanced.

In this regard, it is to be noted that the term "water percentage" described in the above refers to a total amount of pure water added to the phenolic resin until a mixture of the pure water and the phenolic resin becomes white (milkiness), which is represented as a percentage (a temperature of the mixture is 25° C.) Specifically, the water percentage is obtained as follows. First, 10 cc of phenolic resin is sampled in a beaker, and a temperature of the resin is adjusted to 25° C. Then, pure water at 25° C. is added to be mixed with the phenolic resin. The addition of pure water is continued until a mixture of the pure water and the phenolic resin becomes white (milkiness). The water percentage is determined based on the total amount of added pure water (cc) at that time, and practically, it is determined based on the following formula.

Water percentage (%)=100×(amount of added pure water until mixture becomes white (cc))/10

A weight average molecular weight of the phenolic resin is not limited to any specific value, but is preferably 700 or less, and more preferably 130 to 650, and most preferably 150 to 500. If the weight average molecular weight of the phenolic resin is less than the above lower limit value, there is a case where unreacted phenolic monomers are increased and curing properties are also decreased. On the other hand, if the weight average molecular weight of the phenolic resin exceeds the above upper limit value, there is a case where viscosity of the resin is increased and impregnability of the phenolic resin into a fibrous base material of a wet friction material is impaired.

In connection with this, it is to be noted that in the present embodiment a weight average molecular weight was determined by means of GPC (gel permeation chromatography) or the like. An analytical curve was produced using polystyrene standard substance. A measurement by means of GPC was performed using tetrahydrofuran as an elution solvent under the condition that a flow rate was 1.0 ml/min and a temperature of columns was 40° C. In this measurement, a measuring instrument having a product code HLC-8020, an analysis column having a product code TSKgelG1000HXL, two analysis columns having a product code TSKgelG2000HXL each, and an analysis column having a product code TSKgelG3000HXL were used (all of which are manufactured by Tosoh Corporation).

The phenolic resin is not limited to any specific one, but preferably contains sulfite. If the phenolic resin contains sulfite, water solubility of the resin is increased The content of sulfite is not limited to any specific value but, relative to a total weight of the phenolic resin, is preferably 1 to 10 wt %, and more preferably 2 to 5 wt %. If the content of sulfite is within the above range, water solubility of the phenolic resin is further increased.

Examples of sulfites include sodium sulfite, sodium thiosulfate, sodium pyrosulfite, and sodium bisulfite.

Next, a description will be made with regard to the method of manufacturing the resin for wet friction materials according to the present invention.

As described above, the feature of the manufacturing method of the present invention resides in that a water-soluble phenolic resin is obtained by reacting phenols with aldehydes in the presence of at least one basic catalyst to reach a predetermined water percentage. According to this manufacturing method, it is possible to obtain a resin for wet friction materials from which a wet friction material having excellent durability can be obtained.

The predetermined water percentage is not limited to any specific value, but is preferably 200% or higher, and more preferably 300 to 1,000%. If the water percentage is less than the above lower limit value, there is a case where impregnability of the phenolic resin into a fibrous base material of a wet friction material is impaired. On the other hand, if the water percentage exceeds the above upper limit value, there is a case where an effect for enhancing durability of the manufactured wet friction material is decreased.

The reaction process described above can be performed by, for example, placing the phenols, the aldehydes, and the at least one basic catalyst in a reactor having a stirrer to be reacted at a temperature within a range between room temperature and 100° C. for 30 minutes to 2 hours. It is to be noted that a reaction temperature and a reaction time are determined by a target water percentage and a target molecular weight of a resin to be obtained. When the molecular weight and water percentage reach target values, the reaction is terminated and then the resultant resin is cooled immediately. In this way, a water-soluble phenolic resin of the present invention is obtained.

Further, the additional feature of the manufacturing method of the present invention is to obtain a water-soluble phenolic resin through the steps in which sulfite is added to the phenolic resin obtained in the above reaction process and then reaction is carried out until the phenolic resin has a predetermined water percentage. In this way, it is possible to further increase water percentage of the phenolic resin obtained in the above reaction process. That is, addition of sulfite to the phenolic resin makes it possible to increase water percentage of the resin, even if the resin has a relatively high weight average molecular weight and a relatively low water percentage.

An amount of sulfite to be added is not limited to any specific value, but is preferably 1 to 10 wt %, and more preferably 2 to 5 wt % with respect to a total weight of the phenolic resin. If the amount of the added sulfite is less than the above lower limit value, there is a case where an effect for increasing water solubility of the phenolic resin is impaired. On the other hand, if the amount of the added sulfite exceeds the above upper limit value, there is a case where an effect for enhancing strength and durability of the manufactured wet friction material is decreased because viscosity of the phenolic resin becomes so high that wettability of the phenolic resin with a fibrous base material of the wet friction material is decreased.

Next, a description will be made with regard to the wet friction material of the present invention.

The wet friction material of the present invention is manufactured using the resin for wet friction materials described above as a binder.

The wet friction material can be used for, for example, a friction plate, in which the wet friction material is adhered to a core plate. As shown in FIG. 1, a wet friction material 1, which is formed into a ring shape, is adhered to each side of a core plate 3 with an adhesive to obtain a friction plate 4. Further, on the inner side of the core plate 3, there is provided a gear 2 which is to be engaged with a hub of a mating part (not shown). A plurality of friction plates 4 which constitute a wet multi-plate clutch can be freely moved in the axial direction through the gears 2. In the wet multi-plate clutch, separator plates (not shown) are provided in an alternate relation with the friction plates 4 so that the friction plates 4 frictionally engage with the separator plates to transmit power.

When the resin for wet friction materials of the present invention is used as a binder, a wet friction material is manufactured by impregnating a paper body made of a fibrous base material with the resin for wet friction materials and then curing the resin impregnated paper body.

The paper body described above is manufactured through a common papermaking process employing a fibrous base material (an organic fibrous base material and/or an inorganic fibrous base material).

Examples of fibers constituting the fibrous base material include: organic fibers such as natural pulp fibers and aramid fibers; and inorganic fibers such as carbon fibers and glass fibers.

Further, the paper body may include a filler. Examples of such filler include silica, cashew dust, rubber particles, activated carbon, and diatomite. Examples of a method for impregnating the paper body with the resin for wet friction materials include: immersion of the paper body into the water-soluble resin for wet friction materials; coating of the water-soluble resin for wet friction materials to the paper body using various kinds of coater; and spraying of the water-soluble resin for wet friction materials to the paper body using a spray. Among these methods, immersion of the paper body into the water-soluble resin for wet friction materials is preferable By use of this method, it is possible to improve impregnability of the resin for wet friction materials into the paper body.

After impregnation of the paper body with the resin for wet friction materials, the resin impregnated paper body is generally dried at a temperature of 80 to 120° C. for 5 to 30 minutes (to effect dehydration), and is then heated at a temperature of 150 to 230° C. for 10 to 50 minutes to effect curing.

A porosity of the wet friction material of the present invention is not limited to any specific value, but is preferably 20 to 70%, and more preferably 30 to 60%. If the porosity is less than the above lower limit value, there is a case where an effect for enhancing durability of the wet friction material is decreased because efficiency of the action of absorbing and discharging ATF in and out of the wet friction material through its pores is decreased. On the other hand, if the porosity exceeds the above upper limit value, there is a case where strength of the wet friction material is reduced.

As described above, since the wet friction material of the present invention is manufactured using a resin for wet friction materials containing a water-soluble phenolic resin as a main component thereof, the wet friction material can have uniformly distributed pores which have porosity equivalent to that of a conventional wet friction material. Therefore, efficiency of the action of absorbing and discharging ATF in and out of the wet friction material through pores is improved. The reason for this can be explained as follows. In a conventional wet friction material (manufactured using a phenolic resin dissolved in organic solvent), a concentration of a binder is low in a central area of a wet friction material in a thickness direction thereof, while it is high in a vicinity of a surface area of the wet friction material. This means that the number of pores is great in the central area while small in the surface area, which is disadvantageous for an increase in efficiency of absorbing and discharging ATF in and out of the wet friction material through its pores. On the other hand, in the wet friction material of the present invention, a concentration of a binder is uniform in a thickness direction of the wet friction material. Consequently, the number of pores in a vicinity of a surface area of the wet friction material of the present invention is greater than that of the conventional wet friction material assuming that the wet friction material of the present invention and the conventional wet friction material have equivalent porosity. Therefore, ATF can be effectively absorbed and discharged by the wet friction material through its pores, whereby efficiency of heat dissipation can be improved. Thus, it becomes possible to improve the cooling effect for lowering a surface temperature elevated due to sliding, thereby enhancing durability of the wet friction material.

EXAMPLES

The present invention will now be described in detail with reference to the following examples and comparative example. However, it should be understood that the present invention is not limited thereto.

Example 1

<1> Preparation of Resin for Wet Friction Materials 940 parts by weight of phenol, 811 parts by weight of formalin of 37 wt % (F/P=1.0), 10 parts by weight of triethylamine, and 7 parts by weight of sodium hydroxide of 50 wt % were placed in a flask equipped with a stirrer, a reflux condenser and a thermometer to be reacted at a temperature of 80° C. for about 1 hour. When water percentage of the resultant substance reached 500%, it was immediately cooled, to thereby obtain a phenolic resin for wet friction materials having a nonvolatile content of 42 wt %, a water percentage of 500% and a weight average molecular weight of 160. It is to be noted here that the nonvolatile content was determined as follows. First, about 1.5 g of phenolic resin was precisely weighed (expressed by WT1) using an aluminum pan having a known weight. Next, the aluminum pan with 1.5 g of phenolic resin was placed in a hot air circulation drier to be dried at a temperature of 135° C. for 1 hour, after which a total weight of the aluminum pan and phenolic resin was again precisely measured (expressed by WT2). The nonvolatile content was determined by substituting the values of WT1 and WT2 in the following formula.

$$\text{Nonvolatile content (wt \%)} = 100 \times \{(WT2) - (\text{weight of aluminum pan})\} \div (WT1)$$

<2> Preparation of Wet Friction Material

Natural pulp fibers of 35 wt % and aramid fibers of 20 wt % were used as fibrous base material components, and diatom earth of 45 wt % was added thereto as a filler and a friction adjusting material and these substances were dispersed into water to obtain a slurry liquid. Paper was formed from the slurry liquid and then dried to obtain a paper body. The paper body was impregnated with the phenolic resin for wet friction materials obtained in <1> in the above, and the resin impregnated paper body was dried and cured, thereby obtaining a wet friction material having 40 parts by weight of binder with respect to 100 parts by weight of paper body. Next, the thus obtained wet friction material was punched out to form a ring having an outer diameter of 130 mm and an inner diameter of 100 mm. Then, the ring-shaped wet friction material was integrated with a ring-shaped metallic core plate by being held within a mold heated to 200° C., for 30 seconds at 4.903 MPa or a higher pressure, to thereby obtain a friction plate having a diameter of 130 mm and a thickness of 2.3 mm. It is to be noted that in manufacturing the wet friction material, the phenolic resin was diluted with pure water to a target concentration.

Example 2

This example was prepared in the same manner as Example 1 except that a different phenolic resin described hereinbelow was used.

A phenolic resin used in this example was manufactured as follows: 940 parts by weight of phenol, 973 parts by weight of formalin of 37 wt % (F/P=1.2) and 30 parts by weight of sodium hydroxide of 50 wt % were placed in a flask equipped with a stirrer, a reflux condenser and a thermometer to be reacted at a temperature of 85° C. for about 1 hour. When water percentage of the resultant substance reached 400%, it was immediately cooled, to thereby obtain a phenolic resin having a nonvolatile content of 49 wt %, a water percentage of 400% and a weight average molecular weight of 195.

Example 3

This example was prepared in the same manner as Example 1 except that a different phenolic resin described hereinbelow was used.

A phenolic resin used in this example was manufactured as follows: 940 parts by weight of phenol, 1,054 parts by weight of formalin of 37 wt % (F/P=1.3) and 55 parts by weight of sodium hydroxide of 50 wt % were placed in a flask having a stirrer, a reflux condenser, and a thermometer to be reacted at a temperature of 95° C. for about 30 minutes to obtain a substance having a water percentage of 200%. Then, 85 parts by weight of sodium pyrosulfite was added to the obtained substance to be reacted at a temperature of 80° C. for 30 minutes, thereby obtaining a phenolic resin having a nonvolatile content of 59 wt %, a water percentage of 400%, and a weight average molecular weight of 450.

Example 4

This example was prepared in the same manner as Example 1 except that a different phenolic resin described hereinbelow was used.

A phenolic resin used in this example was manufactured as follows: 940 parts by weight of phenol, 649 parts by weight of formalin of 37 wt % (F/P=0.8) and 10 parts by weight of sodium hydroxide of 50 wt % were placed in a flask equipped with a stirrer, a reflux condenser and a thermometer to be reacted at a temperature of 80° C. for about 1 hour. When water percentage of the resultant substance reached 300%, it was immediately cooled, to thereby obtain a phenolic resin having a nonvolatile content of 43 wt %, a water percentage of 300% and a weight average molecular weight of 150.

Example 5

This example was prepared in the same manner as Example 1 except that a different phenolic resin described hereinbelow was used.

A phenolic resin used in this example was manufactured as follows: 940 parts by weight of phenol, 1,297 parts by weight of formalin of 37 wt % (F/P=1.6), 10 parts by weight of triethylamine, and 7 parts by weight of sodium hydroxide of 50 wt % were placed in a flask equipped with a stirrer, a reflux condenser and a thermometer to be reacted at a temperature of 80° C. for about 1 hour and 30 minutes. When water percentage of the resultant substance reached 400%, it was immediately cooled, to thereby obtain a phenolic resin having a nonvolatile content of 41 wt %, a water percentage of 400% and a weight average molecular weight of 180.

Example 6

This example was prepared in the same manner as Example 1 except that a different phenolic resin described hereinbelow was used.

A phenolic resin used in this example was manufactured as follows: 940 parts by weight of phenol, 973 parts by weight of formalin of 37 wt % (F/P=1.2) and 30 parts by weight of sodium hydroxide of 50 wt % were placed in a flask having a stirrer, a reflux condenser and a thermometer to be reacted at a temperature of 85° C. for about 1 hour and 30 minutes. When water percentage of the resultant substance reached 250%, it was immediately cooled, to thereby obtain a phenolic resin having a nonvolatile content of 49 wt %, a water percentage of 250% and a weight average molecular weight of 210.

Comparative Example 1

This comparative example was prepared in the same manner as Example 1 except that a different phenolic resin described hereinbelow was used.

A phenolic resin used in this comparative example was manufactured as follows: 940 parts by weight of phenol, 892 parts by weight of formalin of 37 wt % (F/P=1.1) and 15 parts by weight of sodium hydroxide of 50 wt % were placed in a flask equipped with a stirrer, a reflux condenser and a thermometer to be reacted at a temperature of 100° C. for 1 hour. Then, the resultant substance was dehydrated under a vacuum condition of 110 mmHg, and when a temperature reached to 70° C., 700 parts by weight of methanol was added to the substance, to thereby obtain a phenolic resin having a nonvolatile content of about 50 wt %, a water percentage of 10% and a weight average molecular weight of 350. It is to be noted that the phenolic resin was diluted with methyl alcohol to a target concentration when used in manufacturing wet friction materials.

For each of the wet friction materials prepared in the Examples and the Comparative Example described above, evaluations of the distribution state of phenolic resin and the condition of pores were made The results of these evaluations are shown in Table 1. Each of the evaluations was made as follows.

<1> Evaluation of Distribution State of Phenolic Resin

First, each of the wet friction materials was sliced into five layers along a thickness direction thereof. Then, the resin content of each layer was determined using an ash analysis method. By comparing the resin content among the layers, evaluation of the distribution of phenolic resin from a front surface layer to a rear surface layer in each wet friction material was made.

<2> Evaluation of Condition of Pores

The condition of pores was evaluated based on an average pore size and porosity of each wet friction material. For each of the wet friction materials, measurements of average pore size and porosity were made using an automated mercury intrusion porosimeter (which is manufactured by YUASA-IONICS COMPANY, LIMITED with product name of AUTOSCAN 500).

TABLE 1

| | Distribution state of resin | Average pore size (µm) | Porosity (%) |
|---|---|---|---|
| Example 1 | uniform from front to rear surface | 5.1 | 50.5 |
| Example 2 | uniform from front to rear surface | 5.1 | 50.3 |
| Example 3 | uniform from front to rear surface | 5.3 | 50.4 |
| Example 4 | uniform from front to rear surface | 5.2 | 50.2 |
| Example 5 | uniform from front to rear surface | 5.3 | 50.4 |
| Example 6 | uniform from front to rear surface | 5.2 | 50.3 |
| Comp. Ex. 1 | High in front and rear surfaces and low in middle layers | 6.2 | 50.3 |

As is apparent from Table 1, in each of the wet friction materials prepared in Examples 1 to 6, the distribution of resin was uniform from a front surface layer to a rear surface layer. Also, all of the wet friction materials had a porosity substantially equivalent to that of a conventional material (Comparative Example 1), but had a smaller average pore size than that of the conventional material (Comparative Example 1).

Next, for each of the wet friction materials prepared in the Examples and the Comparative Example described above, evaluation of durability was made. The evaluation was made based on a coefficient of kinetic friction, the number of cycles until peeling-off of the wet friction material occurs, and an amount of thickness loss. Results of respective measurements are shown in Table 2. Each of the measurements was made as follows.

<1> Measurement of Coefficient of Kinetic Friction

Measurement of a coefficient of kinetic friction of the wet friction material was made using a SAE#2 friction test machine. Test conditions are shown below.

Revolutions per minute: 3,600 rpm
Moment of inertia: 0.343 kg·m
Fastening pressure: 785 kPa
Number of cycles: 5,000 times
Oil temperature: 100° C.
Volume of ATF: 700 ml <2> Measurement of Number of Cycles Until Peeling-off of Wet Friction Material Occurs Durability test based on the number of cycles until peeling-off of the wet friction material occurs was performed. Test conditions are shown below.

Revolutions per minute: 7,600 rpm
Moment of inertia: 0.123 kg·m
Fastening pressure: 519 kPa
Oil temperature: 100° C.
Volume of ATF: 360 ml/min <3> Measurement of Amount of Thickness Loss Measurement of an amount of thickness loss of the wet friction material was made. Test conditions are shown below.

Revolutions per minute: 3,600 rpm
Moment of inertia: 0.343 kg·m
Fastening pressure: 785 kPa
Number of cycles: 5,000 times
Oil temperature: 100° C.
Volume of ATF: 700 ml

TABLE 2

| | Coefficient of Kinetic friction | Number of Cycles | Amount of Thickness loss (µm) |
|---|---|---|---|
| Example 1 | 0.13 | 10,000 | 30 |
| Example 2 | 0.13 | 9,000 | 31 |
| Example 3 | 0.13 | 7,000 | 33 |
| Example 4 | 0.13 | 8,000 | 32 |
| Example 5 | 0.13 | 7,000 | 34 |
| Example 6 | 0.13 | 8,000 | 32 |
| Comparative Ex. 1 | 0.13 | 4,000 | 45 |

As is apparent from Table 2, each of the wet friction materials prepared in Examples 1 to 6 had a coefficient of kinetic friction equal to that of a conventional material (Comparative Example 1), but had a larger number of cycles and a smaller amount of thickness loss as compared to those of the conventional material (Comparative Example 1). From the result, it can be said that all of the wet friction materials according to the present invention had excellent durability.

As described above, by manufacturing a wet friction material using the resin for wet friction materials of the present invention as a binder, it is possible to obtain a wet friction material having excellent durability with maintaining a good coefficient of friction.

Further, according to the present invention, it is possible to manufacture a resin for wet friction materials which has significantly less environmental impact while enabling a significant saving of energy.

Furthermore, according to the present invention, it is possible to obtain a wet friction material having a good coefficient of friction and a small amount of thickness loss, that is, it is possible to obtain a wet friction material having excellent durability.

What is claimed is:

1. A resin for wet friction materials, the resin for wet friction materials being obtained by the reaction of phenols with aldehydes in the presence of at least one basic catalyst, wherein the resin comprises a water-soluble phenolic resin as a main component thereof.

2. The resin for wet friction materials as claimed in claim 1, wherein the resin for wet friction materials is obtained by reacting the phenols and the aldehydes in a mole ratio (aldehydes/phenols) of 0.8 to 1.6.

3. The resin for wet friction materials as claimed in claim 1, wherein the phenolic resin has a weight average molecular weight equal to or lower than 700.

4. The resin for wet friction materials as claimed in claim 1, wherein the phenolic resin contains sulfite.

5. A method of manufacturing a resin for wet friction materials, comprising the step of reacting phenols and aldehydes in the presence of at least one basic catalyst to obtain a water-soluble phenolic resin having a predetermined water percentage.

6. The method of manufacturing a resin for wet friction materials as claimed in claim 5, further comprising the step of adding sulfite to the obtained phenolic resin to be reacted to obtain a water-soluble phenolic resin having a predetermined water percentage.

7. The method of manufacturing a resin for wet friction material as claimed in claim 5, wherein the predetermined water percentage is equal to or higher than 200%.

8. A wet friction material comprising a base material and a binder impregnated to the base material, wherein the binder is formed of the resin for wet friction materials claimed in claim 1.

9. A wet friction material comprising a base material and a binder impregnated to the base material, wherein the binder is formed of the resin for wet friction materials claimed in claim 2.

10. A wet friction material comprising a base material and a binder impregnated to the base material, wherein the binder is formed of the resin for wet friction materials claimed in claim 3.

11. A wet friction material comprising a base material and a binder impregnated to the base material, wherein the binder is formed of the resin for wet friction materials claimed in claim 4.

* * * * *